United States Patent [19]
Proust

[11] Patent Number: 6,079,774
[45] Date of Patent: Jun. 27, 2000

[54] ERGONOMIC BICYCLE SADDLE

[76] Inventor: Daniel Proust, 6, place du Marhalle, F-56870 Baden, France

[21] Appl. No.: 08/803,635

[22] Filed: Feb. 21, 1997

Related U.S. Application Data

[63] Continuation of application No. PCT/FR95/01104, Aug. 23, 1995.

[30] Foreign Application Priority Data

Aug. 23, 1994 [FR] France ................................. 94 10354

[51] Int. Cl.$^7$ ........................................................ B62J 1/00
[52] U.S. Cl. ...................................... 297/195.1; 297/201
[58] Field of Search ................................ 297/195.1, 201, 297/203, 214, 215.3, 215.15, 215.16, 344.21

[56] References Cited

U.S. PATENT DOCUMENTS 4,877,286  10/1989  Hobson et al. .
5,123,698   6/1992  Hodges ................................... 297/201

FOREIGN PATENT DOCUMENTS 467541   1/1992  European Pat. Off. .
 99557   5/1898  Germany .
738672   7/1943  Germany .
473405  10/1937  United Kingdom ................. 297/195.1
2093779   9/1982  United Kingdom .

*Primary Examiner*—Laurie K. Cranmer
*Attorney, Agent, or Firm*—Sughrue, Mion, Zinn, Macpeak & Seas, PLLC

[57] ABSTRACT

Ergonomic bicycle saddle mounted onto the saddle post (2) so as to swivel about the axis (XX') thereof. According to the invention, the saddle is swivel-mounted in the region of its front part so that virtually none of the saddle portion projects over the saddle post (2).

12 Claims, 2 Drawing Sheets

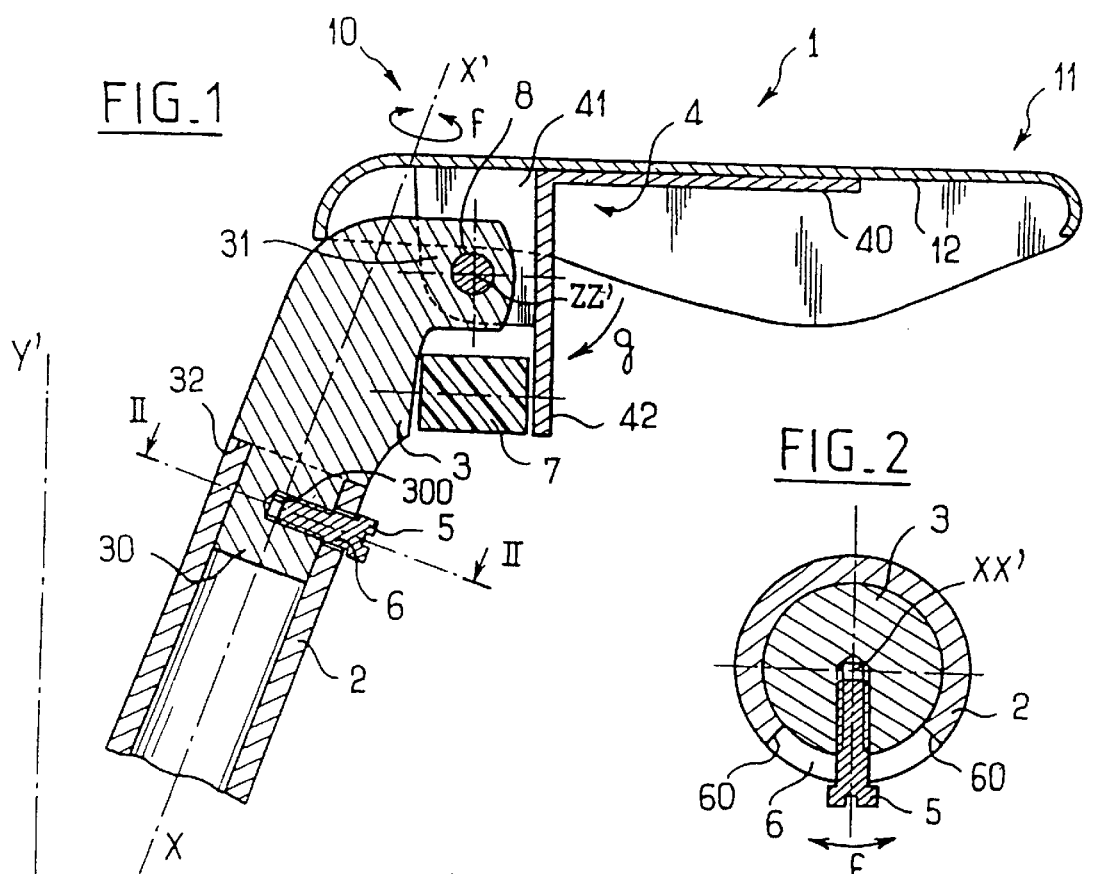
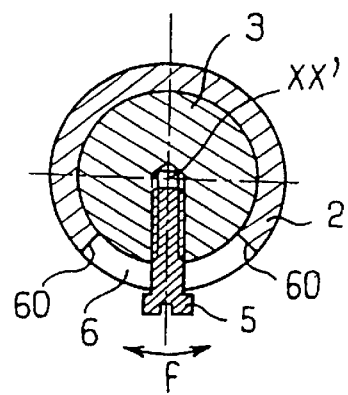
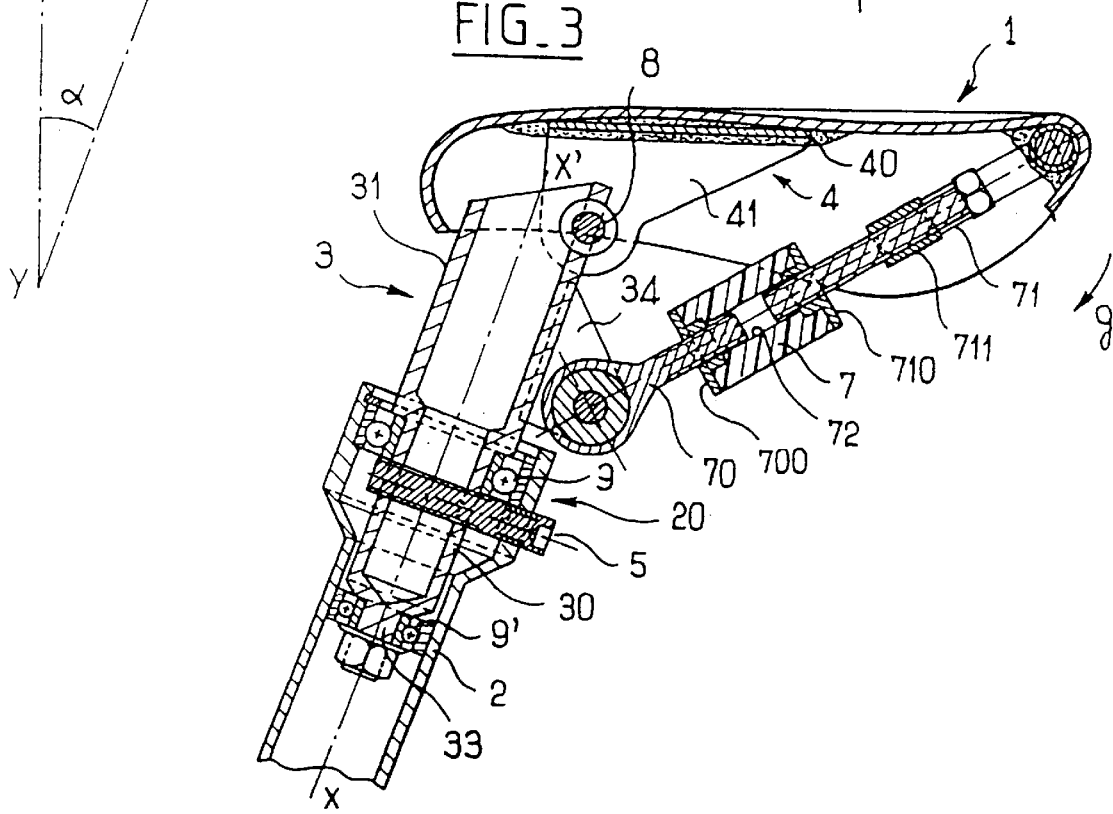

ERGONOMIC BICYCLE SADDLE

This application is a continuation of international application number PCTFR/95/01104, filed Aug. 23, 1995.

This invention applies to an ergonomic bicycle saddle.

It is particularly adapted for people who intensively use a bicycle, especially competitive cyclists.

In terms of shape, the traditional saddle has hardly evolved since the bicycle was actually invented.

The front part of the saddle hereinafter referred as the "saddle nose", causes undue pressure to the genitals as well as rubbing and irritation to the insides of the thighs during pedaling.

Often, the saddle can irritate the skin thus producing sores and other types of skin problems. It is in favor of, or can lead to, bruising of the perineum and discomfort due to constrictions of genital area, especially during prolonged effort and even more so during competitive cycling.

As a consequence of this uncomfortable rubbing, the saddle nose tends to make the cyclist alter his pedaling to an outward movement (his knees would stick out sideways). This movement therefore reduces biomechanical efficiency at the expense of the overall articular, muscular, ligamentar and tendinous system.

Furthermore, the swaying of the body caused by the rigidity of the saddle creates rubbing, pressure of the rear thigh muscles when they are brought into play, and compression between the ischiums (supports for the buttocks) which can lead to induration, well known to cyclists and sports doctors alike.

This problem occurs in people who have one leg shorter than the other. They have to sway from side to side in order that the foot of their shortest leg can correctly push down the corresponding pedal.

Document EP-A-O 467 541 describes a bicycle saddle that has an attachment articulated around the axis of the saddle mounting post. This type of articulated attachment prevents the above mentioned problems related to the rigidity of the traditional saddle. However, it does not in any way resolve the problems caused by the presence of the saddle nose.

The aim of the present invention is to provide a solution to both series of different disadvantages.

It aims to attain these objects by simple and inexpensive means.

The invention is that of a saddle that is mounted onto the saddle mounting post, so as to swivel around the axis thereof.

According to the invention, the saddle is swivel-mounted in the region of its front part, doing away with the saddle nose, so that there is not any or hardly any over-hang forward of the saddle mounting post.

The absence of the saddle nose allows the cyclist to move more freely and avoids most of the rubbing and compression, the cyclist's body now supported on the saddle level with the ischiums.

Surprisingly, the unbalance that would normally result from the saddle nose being absent is compensated by the swiveling movement around the axis of the saddle mounting post. The cyclist is now in a pedaling position, close to that of a runner.

In a way, the saddle is subservient to "human mechanics".

What is more, the swiveling movement around the axis of the saddle mounting post allows those who have one leg shorter than the other to push down correctly on the pedal without having to rock to one side.

Other advantageous and not exhaustive features include:

it has means for limiting the amplitude of the swiveling movement in relation to the axis of the saddle mounting post.

it is firmly attached to a mounting element, namely a tube, fitted to the interior of the saddle mounting post.

it is firmly attached to a mounting tube clamped onto the saddle mounting post.

one of these components (the tube or the post) is fitted with an axis forming a stop, said axis cooperating with a port bored in the other component (the post or the tube).

it has means for resisting to the swiveling movement.

it has, in addition, a fitting that pivots around a horizontal axis, at right angles to the axis of the saddle mounting post.

it is equipped with means for cushioning the swiveling movement around the above mentioned horizontal axis.

it has at least one ball bearing to guide the above mentioned tube and post during rotation.

the axis of the saddle mounting post is inclined by 30° to the vertical.

Other features and advantages of the invention will appear in the detailed description of the preferred embodiments that will follow. This description will be made in reference to the attached drawings in which:

FIG. 1 is a simplified vertical cross-section of a saddle according to the invention, fitted to a saddle mounting post.

FIG. 2 is a cross-section along the line II—II of FIG. 1.

FIG. 3 is a vertical cross-section of a preferred embodiment of the saddle, fitted to a saddle mounting post.

FIG. 1 is a simplified view, in vertical cross-section, of a saddle according to the invention, and FIG. 4 is a perspective view of a saddle according to the invention, simply in order to show its overall structure and working.

Figure 4:
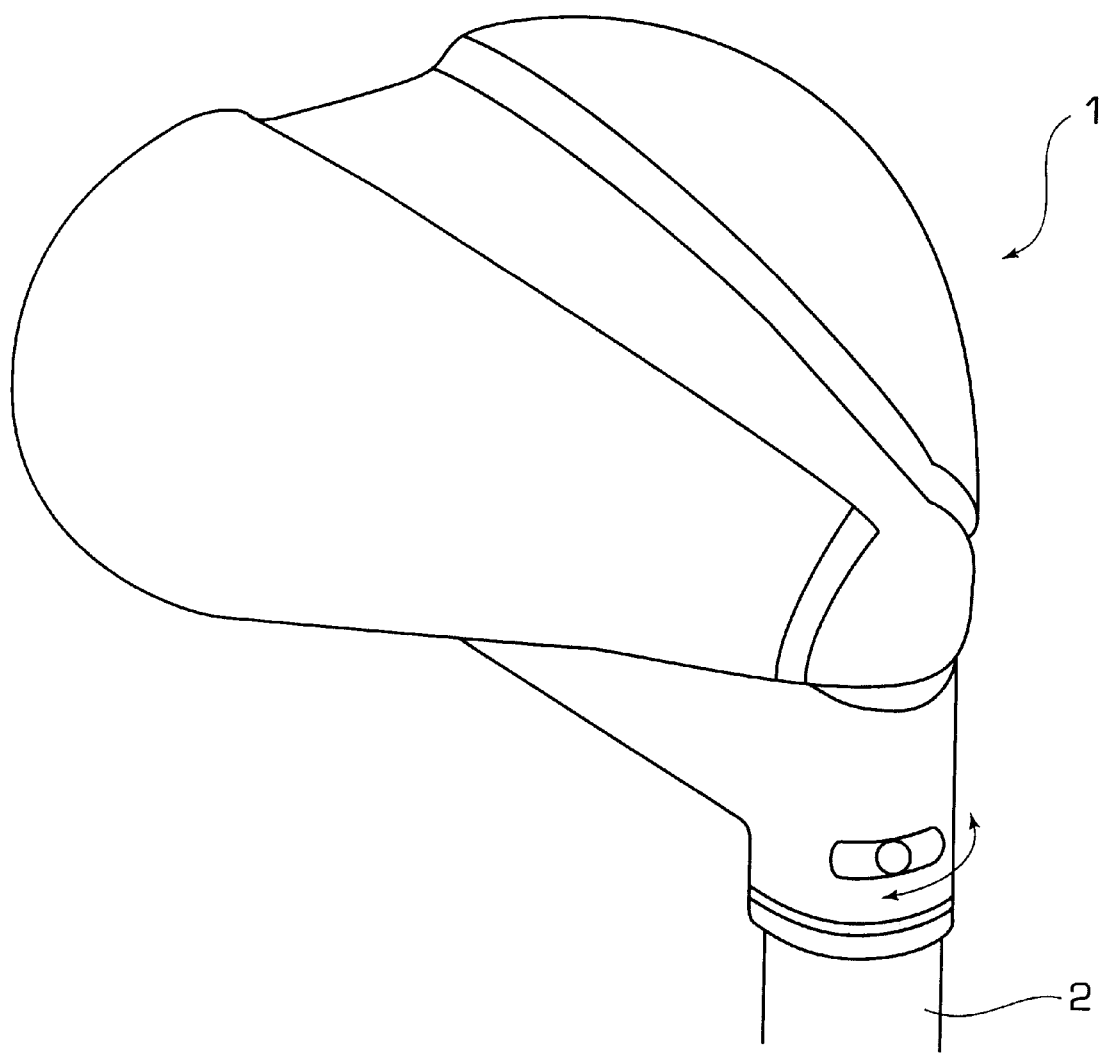
FIG. 4 is a perspective view of the saddle fitted to a saddle mounting post.

This saddle is fitted to the saddle mounting post (2) (classic type), which is fitted to a non represented bicycle.

The axis of the saddle mounting post (2) is referred to as XX', whereas axis YY' refers to the vertical. It is recommended that these axis form between them an angle α lesser or equal to 30°. Ideally this angle should be situated between 20° and 30°.

It consists in a metallic tube open at its top end. Inside this end fits the lower cylindrical part (30) of a mounting element (3) of the saddle (1).

This mounting element (3) is solid and long-shaped. In an alternative embodiment, this mounting element could be tubular. It fits into the extension of the saddle mounting post (2) It has a top end (31) that forms an elbow with the rest of the mounting element.

In its lower part (30), the mounting element (3) contains a threaded radial hole (300). As for the mounting post (2) of the saddle, it has, facing this hole, a port (60) that extends, in a semi circle, partly around the circumference of the saddle mounting post (2).

A screw (5) that links the threaded hole (6) is fitted through the port (60).

In this way, one can swivel the mounting element (3) in relation to the axis XX' of the tube (2) whilst limiting the amplitude of this movement (arrows (f), FIGS. 1 and 2). Indeed, the movement of the mounting element (3) is limited by screw (5) acting as a stop against the opposite sides (60) of port (6).

Means for resisting the swiveling movement can be employed. They comprise, for examples, a return device enabling a re-centering of the saddle, like return springs.

The saddle (1) could, for example, be made of molded polyester.

Its front and rear parts are shown by numbers 10 and 11.

It is held at its under side to the horizontal wing (40) by an angle bar (4). The holding could be made by use of glue.

The angle bar (4) possesses a second wing (42) that bears downwards by 90° to the horizontal wing (40).

The side of wing (42) opposite wing (40) comprises two parallel strips (41) that extend vertically. One of them only is visible in FIG. 1.

A shaft (8) crosses these strips as well as the mounting element (3) at its top end (31).

The strips (41) form with the wing (42) of the angle bar (4), a type of articulation coupling for the saddle (1) on mounting element (3).

Shaft (8) on the axis ZZ' is adequately guided in the components (41) and (31) and is placed horizontally, in other words at right angles to the axis XX'.

Shock absorber (7), constituted by means of a small elastic buffer, are placed between the wing (42) of the angle bar (4) and the mounting element (3). Their function is to cushion the swiveling of the saddle in relation to axis ZZ'. For the sake of simplicity, the attachments for the buffer to the saddle are not shown on the figure.

FIG. 1 clearly shows that the swivel-mounting of the saddle with regard to tube (2) is situated level to its front part (10), thus doing away with the traditional saddle nose, i.e.: there is not any or hardly any over-hang forward of the saddle mounting post.

FIG. 3 shows a preferred embodiment for the saddle according to the invention. In this figure, the elements identical or similar to those in FIG. 1 bear the same references.

The saddle mounting post (2) possesses a top end (20) of greater diameter that the rest of the mounting post. Where the two parts meet, the mounting post is truncated in shape.

The mounting element (3) of the saddle (1) is composed of a tube which bears a top end (31) that extends outwards and to the extension of the saddle mounting post (2).

It is also composed of an intermediary section (30), smaller in diameter, that extends to the part of the saddle mounting post (2) bearing a smaller diameter.

Finally it has a bottom end (33) of even smaller diameter.

Two ball bearings 9 and 9' guide tube (3) in relation to the saddle mounting post (2) when in motion, and are fitted respectively to sections (30) and (33) of tube (3).

As in the embodiment of FIG. 1, a screw goes through a port (6) bored in tube (2), as well as section (30) of tube (3) thus enabling the saddle to swivel around the axis XX' of the saddle mounting post.

The saddle (1) is fitted to a yoke (4) at its horizontal base (41). The yoke has two parallel and lateral flanges (41) (one being visible in FIG. 3) that extend vertically along the upper end of tube (3).

The yoke is articulated at this point on tube (3) using a small horizontally positioned shaft (8).

On the rear of tube (3), at part (31), there are two soldered parallel strips (34) on which a rod (70) is articulated.

Upon its free end is placed a disc (700).

In the same way, a second rod (71) is articulated on the saddle at its lower end.

It also has a disc (710) mounted close to its free end.

This second rod is in fact composed of two different sections whose total length is adjustable by means of a small knurled cover (711).

The free ends of the two rods are slightly apart from each other and, in between discs (700) and (710) is placed a cylindrical elastic buffer (7). It bears an axial opening (72) allowing it to clamp over the free ends of the two rods.

Deformation of the saddle in the direction of arrow g by pivoting around shaft (8) is damped by the elastic buffer that gets compressed.

In addition, the inclination of the saddle to the horizontal can be adjusted by way of the knurled cover (711).

Other fittings or adjustments can be added to the saddle to enhance comfort and improve its lightness according to what the bicycle is to be used for (leisure, cross-country or racing).

The width of the saddle can be chosen according to individual requirements and especially according to the cyclist's trunk size.

As was mentioned earlier, the absence of the saddle nose allows the cyclist to move more freely and to avoid most of the rubbing and compression.

The alternative swiveling movement of the saddle that results from the pedaling action allows for mobility of the cyclist's lumbar-vertebral area. This area is now no longer rigid as with traditional saddles, which reduces the risk of lumbago related to prolonged and repetitive activity.

Furthermore, this invention provides the following advantages:

support for the body on the saddle solely by the ischiums, thus avoiding a lot of rubbing and compression.

avoidance of the "limping" caused by one leg being shorter than the other.

better oxygenation of the muscles during stretching phases.

easier blood circulation.

greater pedaling power, the weight of the body can more easily move from side to side.

balanced support for the joints (condyle, tibia).

the leg "falls" straight down towards the pedal (no ligamentar contraction).

similar movements to those of a runner (no constraining of the crutch).

What is claimed is:

1. An ergonomic bicycle saddle for supporting a rider, said saddle mounted on a bicycle saddle mounting post so as to swivel around a longitudinal axis (XX') of the saddle mounting post, and wherein said swivel-mounting is located at a front end portion of said saddle so that no substantial portion of said saddle extends forward of the saddle mounting post, and wherein said saddle is configured so as to support the rider only by the rider's ischiums: and further comprising means (5,6) to limit an amplitude of the swivel movement of the saddle (1) in relation to the longitudinal axis (XX') of the saddle mounting post (2).

2. The saddle according to claim 1, further comprising a mounting tube for coupling said saddle to the mounting post, and wherein one end of said mounting tube is fitted inside the mounting post.

3. The saddle according to claim 2, wherein said means to limit the amplitude of the swivel movement of the saddle is configured such that one of the saddle post (2) and the mounting tube (3) is fitted with a stop, and the other of the saddle post and the mounting tube has an opening (6), and wherein said stop cooperates with said opening so as to limit the amplitude of the swivel movement of said saddle.

4. The saddle according to claim 2, further comprising at least one ball bearing (9,9') to guide the mounting tube (3) during the swivel movement of said saddle around the longitudinal axis of the saddle mounting post.

5. The saddle according to claim 1, further comprising a mounting tube for coupling said saddle to the mounting post, and wherein said mounting tube is clamped onto the saddle mounting post (2).

6. The saddle according to claim 1, further comprising means for resisting the swivel movement of the saddle around the longitudinal axis of the mounting post.

7. The saddle according to claim 1, further comprising a fitting for allowing said saddle to swivel around a horizontal axis (ZZ') which is at a right angle to the longitudinal axis (XX') of the saddle mounting post (2).

8. The saddle according to claim 7, further comprising means for cushioning the swiveling movement of said saddle around the horizontal axis (ZZ') which is at a right angle to the longitudinal axis of the saddle mounting post.

9. The saddle according to claim 7 further comprising means for setting an inclination of said saddle about the horizontal axis which is at right angle to the longitudinal axis of the saddle mounting post.

10. The saddle according to claim 1, wherein the longitudinal axis (XX') of the saddle mounting post (2) is inclined by 30° to the vertical.

11. An ergonomic bicycle saddle for supporting a rider on a bicycle having a saddle mounting post, said saddle having a substantially triangular form defined by three corners and rotatably mounted to the saddle mounting post at one of the three corners so as to swivel about a longitudinal axis of the saddle mounting post, wherein the saddle is configured so as to support the rider only by the rider's ischiums, and further comprising means (5,6) to limit an amplitude of the swivel movement of the saddle (1) in relation to the longitudinal axis (XX') of the saddle mounting post (2).

12. An ergonomic bicycle saddle for supporting a rider, said saddle mounted on a bicycle saddle mounting post so as to swivel around a longitudinal axis (XX') of the saddle mounting post, and wherein said swivel-mounting is located at a front end portion of said saddle so that no substantial portion of said saddle extends forward of the saddle mounting post, and wherein said saddle is configured so as to support the rider only by the rider's ischiums, further comprising a fitting for allowing said saddle to swivel around a horizontal axis (ZZ') which is at a right angle to the longitudinal axis (XX') of the saddle mounting post (2), and means for setting an inclination of said saddle about the horizontal axis which is at right angle to the longitudinal axis of the saddle mounting post.

\* \* \* \* \*